United States Patent [19]

Ye

[11] Patent Number: 5,128,010
[45] Date of Patent: Jul. 7, 1992

[54] APPARATUS FOR ELECTRICAL MACHINING

[76] Inventor: Liangcai Ye, Beijing Prospect Machine Plant, Tong-county, Beijing, China

[21] Appl. No.: 567,953

[22] Filed: Aug. 7, 1990

[51] Int. Cl.$^5$ .................. B23H 7/12; B23H 7/26; B23H 7/36
[52] U.S. Cl. .................. 204/212; 204/224 M; 204/225; 204/129.75; 219/69.2
[58] Field of Search ............. 204/212, 224 M, 129.75, 204/225; 219/69.11, 69.2

[56] References Cited

U.S. PATENT DOCUMENTS

| | | | |
|---|---|---|---|
| 3,345,281 | 10/1987 | Falls | 204/212 |
| 3,420,759 | 1/1969 | Inoue | 204/129.75 X |
| 3,474,013 | 10/1969 | Inoue | 204/212 X |
| 4,448,656 | 5/1984 | Kuromatsu | 204/129.46 X |
| 4,504,370 | 3/1985 | Lindner et al. | 204/129.1 |
| 4,641,007 | 2/1987 | Lach | 204/129.46 X |
| 4,851,090 | 7/1989 | Burns et al. | 204/212 X |
| 4,948,488 | 8/1990 | Tsymbal et al. | 204/212 |

FOREIGN PATENT DOCUMENTS 87106421 5/1988 China.

Primary Examiner—Donald R. Valentine
Attorney, Agent, or Firm—Lowe, Price, LeBlanc & Becker

[57] ABSTRACT

An apparatus for electrical processing according to the present invention comprises a machine tool, a power supply means and a working fluid system. A tool is rotatably mounted on the machine tool. A workpiece and the tool are connected to the output terminals of the power supply means. In course of the processing, the tool is rotated through a motor, and working fluid is applied to the tool and the workpiece by the working fluid system. The operation voltage and current rnage from 25V to 28V and 1600A to 3000A respectively for a rough processing, and 1V to 9V and 1A to 90A for a fine processing.

5 Claims, 1 Drawing Sheet

APPARATUS FOR ELECTRICAL MACHINING

FIELD OF THE INVENTION

The invention relates to an apparatus for electrical processing which is used for processing various conducting materials, particularly, for processing materials of high-hardness, high-toughness, high-strength and high-brittleness in high efficiency.

BACKGROUND OF THE INVENTION

To process materials of high-hardness, high-strength and high-viscosity, such as tungsten carbide, cerment, alloys of titanium base, nickel base of aluminum base, titanium alloys, cast iron with high content of chromium, and galvanized iron is as yet a problem in mechanical machining and electrical working or in other processes, processes, especially, when the workpieces to be processed are of very rough surfaces which require a rough machining to machine away a relative large quantity of materials from the workpieces. The conventional processes are in general with poor productivity, high cost and large energy consumption.

Moreover, the machines involved are easily worn out and there are requirements of expensive tools and abrasives. There appears also either a heavy labor or a low yield which has become a question to be solved in metal working industry.

CN 87106421 A discloses a combined process of electric discharge and mechanical grinding and the apparatus thereof for processing high-hardness metal materials. But it is still not satisfactory for its limited working efficiency and accuracy.

OBJECT OF THE INVENTION

The object of the invention is to provide an apparatus for electrical processing which is used for processing various conducting materials, particularly, for processing materials of high-hardness, high-toughness, high-strength and high-brittleness in high efficiency.

Another object of the invention is to provide an improved working fluid.

These and other objects and advantages of the invention will become more readily apparent from the following description of the invention.

SUMMARY OF THE INVENTION

An apparatus for electrical processing according to the present invention comprises a machine tool, a power supply means and a working fluid system. A tool is rotatably mounted on the machine tool. A workpiece and the tool are connected to the output terminals of the power supply means. In course of the processing, the tool is rotated through a motor, and working fluid is applied to the tool and the workpiece by the working fluid system. The operation voltage and current range from 25 V to 28 V and 1600 A to 3000 A respectively for a rough processing, and 1 V to 9 V and 1 A to 90 A for a fine processing.

DETAILED DESCRIPTION OF THE INVENTION

Figure 1:
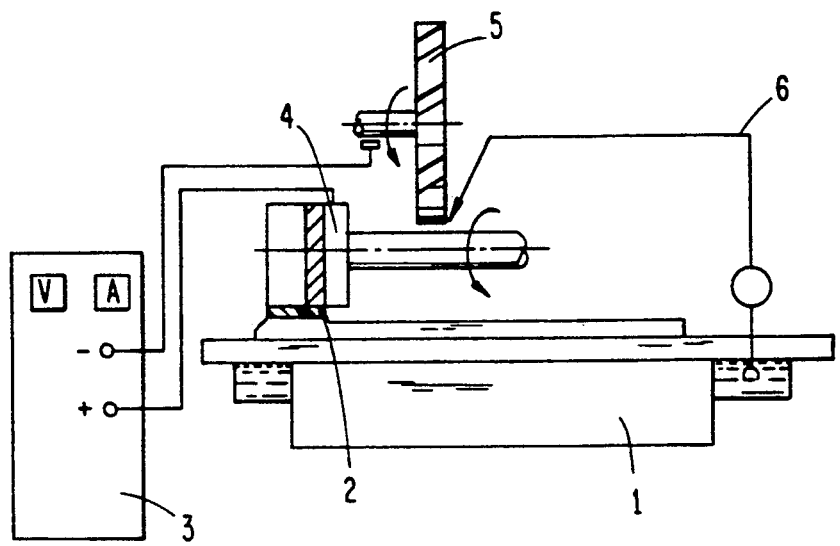
FIG. 1 schematically shows the arrangement of the apparatus of the present invention.

Referring to FIG. 1, numeral reference 1 indicates a machine tool, which can be any of the modified conventional machine tools, building-block machines or production machines. A workpiece can be mounted on the machine tool 1 by conventional means and connected to an output terminal, in this embodiment, the positive output terminal, of a power supply means which will be described in detail hereinafter. The workpiece can be made of any high-hardness, high-toughness, high-strength and high-brittleness material which is electrically conductive, such as tungsten carbide, cerment, white iron, etc. Numeral reference 5 indicates a tool which is rotatably mounted on the machine tool and connected to the other output terminal, in this embodiment, the negative output terminal, of the power supply means. The tool is in the form of a disk. It can be made of various conducting materials, preferably, copper or copper alloy. The thickness of the tool disk can range from 1 mm to 40 mm, preferably, from 16 mm to 18 mm and the diameter of the disk can range from 5 mm to 2000 mm. Preferably, at least one slant slot is provided along the peripheral of the tool disk. The width of the slot may range from 4 mm to 5 mm. Numeral reference 2 indicates insulation means used to insulate the machine tool from the workpiece and the tool.

Working fluid system 6 is used to apply working fluid which is an inorganic aqueous solution to the workpiece and the tool. The working fluid, like conventional cooling liquid, can be used to cool down workpieces and tools and prevent heat from transmitting into the body of the workpiece and the tool. Moreover, in the present invention, the working fluid has the function of "promoting operation", i.e., promoting the melted material of the workpiece to be removed from the surface of the workpiece to complete the processing, when large amount of heat is produced in the working region on the tool and the workpiece due to a heavy current. An aqueous electrolyte solution at low concentration is preferred for its further functions of anti-rust and anti-corrosive, which result in a good protection of the workpiece and a long service life of the machine tool. Some of the aqueous electrolyte solutions at low concentrations may even have a better anti-rust function, e.g., aqueous $NaNO_2$ solution at a concentration ranging from 0.01% to 5% by weight, aqueous NaOH solution, or aqueous $Na_2CO_3$ and $NaNO_2$ mixed solution at concentrations ranging from 0.01% to 5%, preferably at 1% by weight respectively. Since the electrolysis reaction to the working fluid does not affect the processing, the composition and amount of the solute contained in the working fluid keep unchanged after being used. Therefore, the used working fluid can be collected by the working fluid system and be reused after being filtered and diluted.

Figure 2:
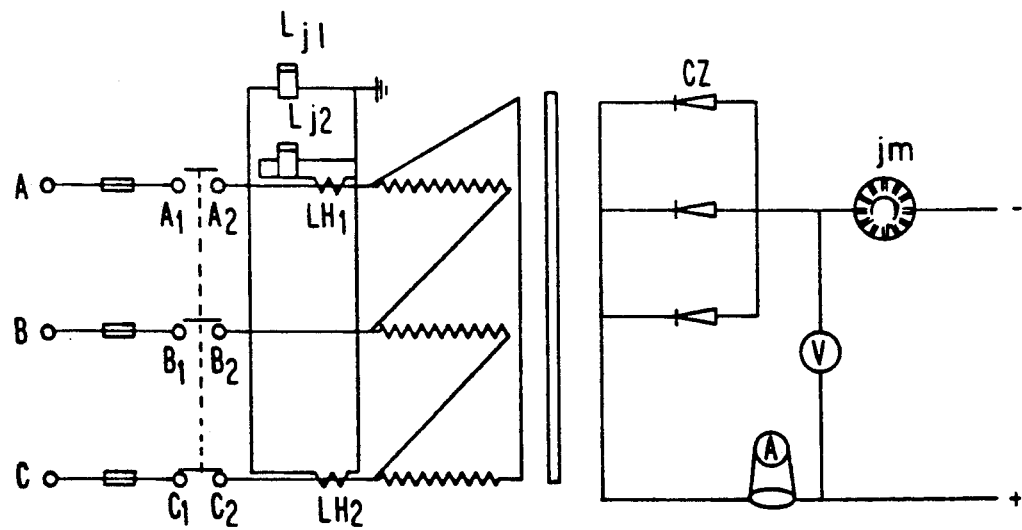
FIG. 2 schematically shows the arrangement of the power supply means.

A description of the power supply means 3 will now be made with reference to FIG. 2, in which a three-phase power supply means is shown. It should be understood that the power supply means is not restricted to this. A six-phase one, a direct power supply means or one of other type is also acceptable. As for the rectification portion of the power supply means, various means such as half-wave rectification or full-wave rectification means can be applied. But a three-phase half-wave rectification is preferred as shown in this embodiment. The power supply means may provide with a current with a low frequency, such as 150 cycle per second in this embodiment. The maximum operation voltage of the power supply means may reach 30 V, and accordingly, the maximum operation current may reach 3000 A.

In course of processing, the workpiece can be either stationary or moved in straight line or in rotation according to the type of the machine tool, the shape of the workpiece and the shape of the surface to be processed. The line speed of the workpiece is less than 1 m/s. The tool can be rotated through a motor (not shown). The line speed of any point of the peripheral of the tool disk should be greater than 10 m/s, preferably, greater than 30 m/s. The rotating tool produces a mechanical pulse of a frequency of 150-30000 rpm which aids to the processing.

There can be a gap, e.g., of 0.01 mm to 0.1 mm, between the workpiece and the tool in the case of a non-contact processing, or the workpiece and the tool may contact instantaneously to generate arc mechanically, which may also aid to the processing. In a rough processing, in order to increase the working efficiency, high voltage and heavy current can be output by the power supply means, e.g., with the operation voltage ranging from 25 V to 28 V and the operation current ranging from 1600 A to 3000 V accordingly. In this case, 300 g material can be removed from the workpiece per minute which has twice the working efficiency. In a fine processing, an operation voltage ranging from 1 V to 9 V and an operation current ranging from 1 A to 90 A can be used. The processing accuracy depends on the operation voltage and current rather than the frequency produced by the power supply means. In a rough processing, it may be of 0.05 mm, and in a fine processing, 0.01 mm.

The foregoing is a description of the best mode for carrying out the invention, but one skilled in the art will, having had the benefit of the foregoing description, may make modifications and variations to all or part of the invention described herein without departing from its true scope and spirit, as defined by the appended claims.

I claim:

1. An apparatus for electrical machining comprising a machine tool;
   a power supply for supplying first operational voltage and current ranging from 1 V to 9 V and 1 A to 90 A and second operational voltage and current ranging from 25 V to 28 V and 1600 A to 3000 A, said power supply having output terminals;
   means for mounting a workpiece for engagement with said machine tool;
   a tool comprised of a conducting material rotatably mounted on the machine tool, said tool and workpiece being connected to the output terminals of said power supply;
   motor for rotating said tool at a peripheral speed of at least 10 m/s;
   a source of low concentration inorganic aqueous solution; and
   means for applying said low concentration inorganic aqueous solution to said tool and workpiece.

2. The apparatus according to claim 1, wherein the source is adapted to claim 1, wherein the source is adapted to contain low concentration inorganic aqueous solution comprising an aqueous $Na_2CO_3$ and $NaNO_2$ mixed solution at concentrations ranging from 0.01% to 5% by weight respectively.

3. The apparatus according to claim 1, wherein the source is adapted to contain low concentration inorganic aqueous solution comprising an aqueous $Na_2CO_3$ and $NaNO_2$ mixed solution at concentrations by 1% by weight, respectively.

4. The apparatus according to claim 1, wherein said power supply means comprises a three-phase half-wave rectification means and said tool producing a mechanical pulse during rotation by said motor means, said mechanical pulse having a frequency of 150-3000 rpm.

5. The apparatus according to claim 1, further comprising
   means for intermittently contacting said tool and said workpiece to mechanically generate an arc to aid said electrical processing.

* * * * *

UNITED STATES PATENT AND TRADEMARK OFFICE
CERTIFICATE OF CORRECTION

PATENT NO. : 5,128,010
DATED : July 7, 1992
INVENTOR(S) : Liangcai YE

It is certified that error appears in the above-identified patent and that said Letters Patent is hereby corrected as shown below:

In claim 2, line 2, delete "adapted to claim 1, wherein the source is"

Signed and Sealed this

Twenty-first Day of September, 1993

Attest:

BRUCE LEHMAN

Attesting Officer

Commissioner of Patents and Trademarks